(12) United States Patent
Chittattukara et al.

(10) Patent No.: US 9,969,924 B2
(45) Date of Patent: May 15, 2018

(54) DUAL FUNCTION INTERNAL BREAKER FOR CROSSLINKED HYDROXYETHYLCELLULOSE

(71) Applicant: Halliburton Energy Services, Inc., Houston, TX (US)

(72) Inventors: Shoy George Chittattukara, Thissur (IN); Prajakta Ratnakar Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/023,041

(22) PCT Filed: Oct. 18, 2013

(86) PCT No.: PCT/US2013/065590
§ 371 (c)(1),
(2) Date: Mar. 18, 2016

(87) PCT Pub. No.: WO2015/057238
PCT Pub. Date: Apr. 23, 2015

(65) Prior Publication Data
US 2016/0230073 A1 Aug. 11, 2016

(51) Int. Cl.
| | | |
|---|---|---|
| *C09K 8/10* | (2006.01) | |
| *C09K 8/74* | (2006.01) | |
| *C09K 8/512* | (2006.01) | |
| *C09K 8/514* | (2006.01) | |
| *E21B 21/00* | (2006.01) | |
| *E21B 33/138* | (2006.01) | |

(52) U.S. Cl.
CPC ............... *C09K 8/512* (2013.01); *C09K 8/10* (2013.01); *C09K 8/514* (2013.01); *E21B 21/003* (2013.01); *E21B 33/138* (2013.01); *C09K 2208/26* (2013.01)

(58) Field of Classification Search
CPC .......... C09K 8/10; C09K 8/512; C09K 8/514; C09K 2208/26; E21B 21/003; E21B 33/138
USPC ....................................................... 507/216
See application file for complete search history.

(56) References Cited

U.S. PATENT DOCUMENTS

| 8,507,412 | B2 | 8/2013 | Lukocs et al. | |
|---|---|---|---|---|
| 2002/0125012 | A1* | 9/2002 | Dawson | C09K 8/685 |
| | | | | 166/300 |
| 2008/0217011 | A1 | 9/2008 | Pauls et al. | |
| 2011/0152133 | A1 | 6/2011 | Sanders et al. | |
| 2011/0240297 | A1* | 10/2011 | Lord | C09K 8/685 |
| | | | | 166/308.5 |
| 2011/0259592 | A1 | 10/2011 | Reyes | |
| 2013/0206416 | A1* | 8/2013 | Dobson, Jr. | C09K 8/64 |
| | | | | 166/308.2 |
| 2014/0005314 | A1* | 1/2014 | Minowa | C08F 216/06 |
| | | | | 524/204 |
| 2016/0130497 | A1* | 5/2016 | Liu | C09K 8/03 |
| | | | | 166/312 |

FOREIGN PATENT DOCUMENTS

| WO | 2009-107017 A1 | 9/2009 |
|---|---|---|
| WO | 2010-046618 A1 | 4/2010 |
| WO | 2011-077336 A2 | 6/2011 |

OTHER PUBLICATIONS

Sigma Aldrich safety data sheet of zirconum acetylacetonate, 2016, p. 5.*
International Search Report and Written Opinion issued in related PCT Application No. PCT/US2013/065590 dated Jul. 24, 2014, 14 pages.
Christensen, Bjørn E., Mildrid H. Myhr, and Olav Smidsrød. "Degradation of double-stranded xanthan by hydrogen peroxide in the presence of ferrous ions: comparison to acid hydrolysis." Carbohydrate research 280.1 (1996), pp. 85-99.

* cited by examiner

*Primary Examiner* — Aiqun Li
(74) *Attorney, Agent, or Firm* — Craig Roddy; Baker Botts L.L.P.

(57) ABSTRACT

Treatment fluids for use in a well, the treatment fluids including: (a) water; (b) hydroxyalkylcellulose, wherein the hydroxyalkylcellulose is hydrated in the water-based continuous phase; (c) a crosslinker for the hydroxyalkylcellulose; (d) magnesium peroxide in particulate form; and (e) a transition metal containing complex having at least one organic ligand. Methods of treating a treatment zone in a well, the methods comprising: (A) forming a treatment fluid according to the disclosure; and (B) introducing the treatment fluid into a well.

20 Claims, No Drawings

DUAL FUNCTION INTERNAL BREAKER FOR CROSSLINKED HYDROXYETHYLCELLULOSE

CROSS-REFERENCE TO RELATED APPLICATION

The present application is a U.S. National Stage Application of International Application No. PCT/US2013/065590 filed Oct. 18, 2013, which is incorporated herein by reference in its entirety for all purposes.

TECHNICAL FIELD

The disclosure is in the field of producing crude oil or natural gas from subterranean formations. More specifically, the disclosure generally relates to methods of breaking a viscosified treatment fluid for use in a well or a filter cake formed in a well with such a treatment fluid.

BACKGROUND

A crosslinkable hydroxyethylcellulose ("HEC") treatment fluid (for example, a pill) for use in a well penetrating a subterranean formation can utilize internal and external breakers to break the viscosity of the fluid. However, most of the known internal breakers begin to degrade the polymer shortly after adding them to the pill. This reduces the viscosity of the pill and leads to fluid loss earlier than expected. Moreover, a HEC pill can form a filter cake on the formation face. Due to unavailability of a liquid internal breaker for filter cake removal, an external breaker such as hydrochloric acid is normally required for complete clean up of the filter cake.

GENERAL DESCRIPTION OF EMBODIMENTS

This disclosure provides a single internal breaker composition that can successfully reduce the viscosity of a crosslinked hydroxyalkylcellulose fluid (such as crosslinked HEC) and also helps for removal of a filter cake formed with such a fluid without need for the use of an external breaker.

The newly developed single internal breaker system comprises of magnesium peroxide. Magnesium peroxide is insoluble in water and decomposes at 572° F. (350° C.).

Magnesium peroxide releases oxygen by breaking down at a controlled rate with water. Due to its controlled release, the solid breaker material remains available in the filter cake for complete cake removal, with no fluid loss in early stages. Moreover, the gel breaks cleanly with viscosity <5 cP after desired time period.

A transition metal containing complex can be used to accelerate the breaking and to reduce the concentration of the breaker required to achieve the desired breaking time and completeness.

Thus, this internal breaker has a dual function, in breaking either or both of a crosslinked hydroxyalkylcellulose fluid or a filter cake formed with such a fluid. As a result, there is no need to employ an external breaker treatment, such as an external breaker fluid with hydrochloric acid.

Breaker works in both high- and low-density brines, for example, any brine having a density in the range of about 1 g/cc to about 1.8 g/cc.

No early break of fluid viscosity.

This composition can be utilized up to 300° F. (149° C.).

The internal breaker system according to this disclosure can bridge a technology gap by providing single breaker package as against currently used internal and external breakers, to completely break an HEC pill and filter cake.

Magnesium peroxide does not have health, safety, or environmental ("HSE") issues in handling and storage of the chemical.

Treatment fluids for use in a well are disclosed, the treatment fluids including: (a) water; (b) hydroxyalkylcellulose, wherein the hydroxyalkylcellulose is hydrated in the water-based continuous phase; (c) a crosslinker for the hydroxyalkylcellulose; (d) magnesium peroxide in particulate form; and (e) a transition metal containing complex having at least one organic ligand.

Methods of treating a treatment zone in a well are disclosed, the methods comprising: (A) forming a treatment fluid according to the disclosure; and (B) introducing the treatment fluid into a well.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Servicing and Fluids

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling, completion, and intervention operations can include various types of treatments that are commonly performed on a well or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a line pipe, and a transportation pipe.

A fluid can be, for example, a drilling fluid, a setting composition, a treatment fluid, or a spacer fluid. If a fluid is to be used in a relatively small volume, for example less than about 200 barrels (about 8,400 US gallons or about 32 $m^3$), it is sometimes referred to as a wash, dump, slug, or pill.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to a zone into which a fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases, Physical States, and Materials

As used herein, "phase" is used to refer to a substance having a chemical composition and physical state that is distinguishable from an adjacent phase of a substance having a different chemical composition or a different physical state.

The word "material" refers to the substance, constituted of one or more phases, of a physical entity or object. Rock, water, air, metal, cement slurry, sand, and wood are all examples of materials. The word "material" can refer to a single phase of a substance on a bulk scale (larger than a particle) or a bulk scale of a mixture of phases, depending on the context.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

The continuous phase of a treatment fluid is a liquid under Standard Laboratory Conditions.

The term "water" is used generally herein to include fresh water or brine, unless the context otherwise requires.

As used herein, the term "brine" is intended to include, unless the context otherwise requires, any aqueous solution having greater than 1,000 ppm total dissolved mineral salts. Oil field brines commonly contain varying concentrations of mineral salts, e.g., sodium chloride, calcium chloride, and magnesium salts. Aqueous solutions are frequently modified by addition of potassium chloride to stabilize the subsurface clay. Accordingly, potassium chloride is frequently encountered in brines.

As used herein, a "water-based" fluid means that water is the dominant material of the continuous phase, that is, greater than 50% by weight, of the continuous phase of the fluid based on the combined weight of water and any other solvents in the phase (that is, excluding the weight of any dissolved solids).

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary, the flow speed must equal that of the fluid. The region between these two points is named the boundary layer.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of centipoise (cP) or mPa·s, which are equivalent.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

A hydrogel is a gel state having a network of polymer chains that are hydrophilic and for which water is the dispersion medium. In some cases, a "hydrogel" refers to a natural or synthetic polymeric material that is a highly absorbent and that can form such a gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ Model 5550 HPHT viscometer. Such a viscometer measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

In general, a FANN™ Model 35 viscometer does not have temperature and pressure controls, so it is used for fluids at ambient conditions (that is, Standard Laboratory Conditions). However, with an optional heating cup, viscosity can be measured at higher temperatures so long as the temperature is below the boiling point of the solvent. Except to the extent otherwise specified, the apparent viscosity of a fluid having a viscosity of less than about 30 cP (excluding any suspended solid particulate larger than silt) is measured with a FANN™ Model 35 type viscometer with a bob and cup geometry using an R1 rotor, B1 bob, and F1 torsion spring at a shear rate of 511 sec$^{-1}$ (300 rpm) and at a temperature of 77° F. (25° C.) and a pressure of 1 atmosphere.

A substance is considered to be a fluid if it has an apparent viscosity less than 5,000 mPa·s (cP) (independent of any gel characteristic). For reference, the viscosity of pure water is about 1 mPa·s (cP).

As used herein, a fluid is considered to be "viscous" if it has an apparent viscosity of 10 mPa·s (cP) or higher. The viscosity of a viscous fluid is considered to break or be broken if the viscosity is greatly reduced. Preferably, although not necessarily for all applications depending on how high the initial viscosity of the fluid, the viscous fluid breaks to a viscosity of less than 50% of the viscosity of the maximum viscosity or less than 5 mPa·s (cP).

General Measurement Terms

Unless otherwise specified or unless the context otherwise clearly requires, any ratio or percentage means by weight.

If there is any difference between U.S. or Imperial units, U.S. units are intended. For example, "GPT" or "gal/Mgal" means U.S. gallons per thousand U.S. gallons and "ppt" means pounds per thousand U.S. gallons.

Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter (kg/m$^3$) is: 1 lb/gal=(0.4536 kg/lb)×(gal/0.003785 m$^3$)=120 kg/m$^3$.

The conversion between pound per thousand gallons (lb/Mgal) and kilogram per cubic meter (kg/m$^3$) is: 1 lb/Mgal=(0.4536 kg/lb)×(Mgal/3.785 m$^3$)=0.12 kg/m$^3$.

Fluid-Loss Control

Fluid loss refers to the undesirable leakage of a fluid phase of any type of drilling or treatment fluid into the permeable matrix of a subterranean formation. Fluids used in drilling, completion, or servicing of a wellbore can be lost to a subterranean formation while circulating the fluids in the wellbore.

Fluid-loss control refers to treatments designed to reduce fluid loss. Providing effective fluid-loss control for fluids during certain stages of well operations is usually highly desirable.

Fluid-loss control materials are sometimes used in drilling fluids or in treatment fluids.

A fluid-loss control fluid (or pill) is a treatment fluid that is designed or used to provide some degree of fluid-loss control. A fluid-loss control fluid is usually used prior to introducing another drilling fluid or treatment fluid into a zone in a well.

Fluid-loss control fluids typically include an aqueous continuous phase and a high concentration of a viscosifying agent (usually crosslinked), and usually, bridging particles, such as graded sand, graded salt particulate, or graded calcium carbonate particulate. Through a combination of viscosity, solids bridging, and filter cake buildup on the porous rock of the borehole, such fluids are often able to substantially reduce the apparent permeability of a zone of a subterranean formation to fluid loss.

For example, commonly-used fluid-loss control pills contain high concentrations (100 to 150 lb/Mgal) of derivatized hydroxyethylcellulose ("HEC"). HEC is generally accepted as a viscosifying agent affording minimal permeability damage during completion operations. Normally, HEC polymer solutions do not form rigid gels, but control fluid loss by a viscosity-regulated or filtration mechanism. Some other viscosifying polymers that have been used include xanthan, guar, guar derivatives, carboxymethylhydroxyethylcellulose ("CMHEC"), and starch. Viscoelastic surfactants can also be used.

Crosslinked polymers can also be used for fluid-loss control. Crosslinking the viscosifying polymer helps suspend bridging solids in a fluid as well as provide fluid-loss control. Further, crosslinked fluid-loss control fluids have demonstrated that they require relatively limited invasion of the formation face to be effective. To crosslink the viscosifying polymers, a suitable crosslinking agent that includes polyvalent metal ions is used. Boron, aluminum, titanium, and zirconium are common examples.

A preferred crosslinkable viscosifying polymer for fluid-loss control pills are graft copolymers of a hydroxyalkylcellulose, guar, or hydroxypropyl guar that are prepared by a redox reaction with vinyl phosphonic acid. Crosslinks can be formed by hydrating the graft copolymer in an aqueous solution containing at least a trace amount of at least one divalent cation. The addition of a Lewis base or Bronsted-Lowrey base adjusts the pH of the aqueous solution from slightly acidic to slightly basic. Preferably, the chosen base is substantially free of polyvalent metal ions. The resulting crosslinked gel demonstrates shear-thinning and rehealing properties that provide relatively easy pumping, while the rehealed gel provides good fluid-loss control upon placement. Some fluid-loss pills of this type are described in U.S. Pat. No. 5,304,620, assigned to Halliburton Energy Services, the relevant disclosure of which is incorporated herein by reference. Fluid-loss control pills of this type are commercially available under the trade name "K-MAX" from Halliburton Energy Services Inc. in Duncan, Okla.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. As the fluid phase carrying the fluid-loss control material leaks into the formation, the fluid-loss control material bridges the pore throats of the matrix of the formation and builds up on the surface of the borehole or fracture face or penetrates only a little into the matrix. All else being equal, the higher the concentration of the appropriately sized particulate, the faster bridging will occur. The buildup of solid particulate or other fluid-loss control material on the walls of a wellbore or a fracture is referred to as a filter cake. Such a filter cake can help block the further loss of a fluid phase (referred to as a filtrate) into the subterranean formation. A fluid-loss control material is specifically designed to lower the volume of a filtrate that passes through a filter medium. Accordingly, a fluid-loss control material is sometimes referred to as a filtration control agent.

Examples of fluid-loss control agents include, but are not limited to, starches, silica flour, gas bubbles (energized fluid or foam), benzoic acid, soaps, resin particulates, relative permeability modifiers, degradable particulates, diesel dispersed in fluid, and other immiscible fluids.

A fluid-loss control agent can be included in a drilling or treatment fluid in a concentration necessary to give the desired fluid-loss control. In some embodiments, a fluid-loss additive may be included in a concentration of about 5 to about 200 lb/Mgal of the treatment fluid. In some embodiments, the fluid-loss additive may be included in a concentration from about 10 to about 50 lb/Mgal of the treatment fluid.

For some liquid fluid-loss control agents, such as diesel, these may be included in a concentration from about 0.01% to about 20% by volume of the treatment fluid; in some embodiments, these may be included in a concentration from about 1% to about 10% by volume of the treatment fluid.

Damage to Permeability

In well treatments using viscous fluids, the material for increasing the viscosity of the fluid can damage the permeability of the proppant pack or the matrix of the subterranean formation. For example, a treatment fluid can include a polymeric material that is deposited in the fracture or within the matrix. By way of another example, the fluid may include surfactants that leave unbroken micelles in the fracture, lead to slug formation, or change the wettability of the formation in the region of the fracture.

The term "damage" as used herein regarding a formation refers to undesirable deposits in a subterranean formation that may reduce its permeability. Scale, skin, gel residue, and hydrates are contemplated by this term.

Filter Cake Clean Up and Breakers

After application of a filter cake, it is often desirable to restore the permeability of the formation. If the formation permeability of the desired producing zone is not restored, production levels from the formation can be significantly lower. Any filter cake or any solid or polymer filtration into the matrix of the zone resulting from a fluid-loss control treatment must be removed to restore the formation's permeability, preferably to at least its original level. This is often referred to as clean up.

Chemicals used to help remove a filter cake are called breakers.

Breakers for helping to remove a filter cake must be selected to meet the needs of each situation. First, it is important to understand the general performance criteria for breaking. Premature destruction of a filter cake can cause undesired fluid loss into a formation. Inadequate breaking of a filter cake can result in permanent damage to formation permeability. A breaker for removing a filter cake should be selected based on its performance in the temperature, pH, time, and desired filter cake profile for each specific fluid-loss application.

No particular mechanism is necessarily implied by breaking or breaker regarding a filter cake.

A filter cake can be removed, for example, by dissolving the bridging particulate, chemically degrading the viscosity-increasing agent, reversing or breaking crosslinking if the viscosity-increasing agent is crosslinked, or a combination of these. More particularly, for example, a fluid-loss control agent can be selected for being insoluble in water but soluble in acid, whereby changing the pH or washing with an acidic fluid can dissolve the fluid-loss control agent. Chemically degrading the viscosity-increasing agent, reversing or breaking crosslinking if the viscosity-increasing agent is crosslinked, can be another technique for removing a filter cake.

Dual Function Internal Breaker System for Treatment Fluid

Treatment fluids for use in a well are disclosed, the treatment fluids including: (a) water; (b) hydroxyalkylcellulose, wherein the hydroxyalkylcellulose is hydrated in the water-based continuous phase; (c) a crosslinker for the hydroxyalkylcellulose; (d) magnesium peroxide in particulate form; and (e) a transition metal containing complex having at least one organic ligand.

The water can be present in the treatment fluids according to the disclosure in an amount at least sufficient to substantially hydrate the hydroxyalkylcellulose.

The source of the water can include freshwater or non-freshwater. Non-freshwater sources of water can include surface water ranging from brackish water to seawater, brine, returned water (sometimes referred to as flowback water) from the delivery of a fluid into a well, unused fluid, and produced water.

Preferably, the water for use in the treatment fluid does not contain anything that would adversely interact with the other components used in the fluid or with the subterranean formation.

Water-soluble salts can optionally be included in treatment fluids according to this disclosure for various purposes. In some embodiments, the water of the treatment fluid may be a brine. The brine chosen should be compatible with the formation.

For example, one or more salts may be added to a water source to provide a brine, and a resulting treatment fluid, having a desired density, which can help provide an appropriate degree of well control.

Such salts may optionally be included for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid according to this disclosure.

Suitable water-soluble salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like.

The amount of salt that should be added should be the amount necessary for formation compatibility, such as stability of clay minerals, taking into consideration the crystallization temperature of the brine, for example, the temperature at which the salt precipitates from the brine as the temperature drops.

In various embodiments, the treatment fluid additionally comprises: a water-soluble salt dissolved in the water, wherein the water-soluble salt is selected from the group consisting of alkali metal salts, alkaline earth metal salts, and ammonium salts.

In various embodiments, the group consisting of alkali metal salts, alkaline earth metal salts, and ammonium salts is further selected from the group consisting of halides and formates.

In various embodiments, the water having the water-soluble salt dissolved therein has a density in the range of about 1 g/cc to about 1.8 g/cc.

In various embodiments, a continuous phase of the treatment fluid comprises the water.

In various embodiments, the treatment fluid is water-based, wherein the continuous aqueous phase of the fluid is greater than 50% by weight water based on the combined weight of water and any other solvents in the phase (that is, excluding the weight of any dissolved solids).

In some embodiments, the continuous phase, including the dissolved materials therein, may be present in the treatment fluids in an amount in the range from about 1% to about 45% by volume of the treatment fluid.

In various embodiments, the pH of a phase comprising the water is adjusted to be less than about 1 before or after mixing with the hydroxyalkylcellulose but prior to mixing with the crosslinker or magnesium peroxide. This can help hydrate the hydroxyalkylcellulose. After hydrating the hydroxyalkylcellulose, then the crosslinker or magnesium peroxide may increase the pH of the phase comprising the water.

In various embodiments, the pH of a phase comprising the water is in or adjusted to be in the range of about 0.1 to about 2.5 after mixing with the crosslinker and magnesium peroxide.

In various embodiments, the hydroxyalkylcellulose comprises hydroxyethylcellulose.

In various embodiments, the crosslinker is an alkaline earth metal oxide. For example, the alkaline earth oxide metal oxide can comprise magnesium oxide.

The magnesium peroxide is believed to act as the dual function breaker.

In various embodiments, the magnesium peroxide in particulate form has a mesh size in the range of about 300 US mesh to about 100 US mesh.

In various embodiments, the magnesium peroxide in particulate form is not encapsulated.

In various embodiments, a transition metal of the transition metal containing complex is selected from the group consisting of vanadium, manganese, iron, titanium, and cobalt.

In various embodiments, the transition metal containing complex does not have an inorganic ligand.

In various embodiments, the transition metal containing complex does not have a ligand selected from the group of halides.

In various embodiments, the transition metal containing complex is at least sparingly soluble in water.

In various embodiments, the transition metal containing complex is selected from the group consisting of: vanadyl acetylacetonate ($VO(C_5H_7O_2)_2$), titanium bis(acetylacetonate)dichloride, manganese(III) acetylacetonate, iron acetylacetonates, cobalt acetylacetonates.

In various embodiments, the transition metal containing complex is: vanadyl acetylacetonate ($VO(C_5H_7O_2)_2$).

In various embodiments, the treatment fluid can include an alkali metal thiosulfate. It is believed that such a thiosulfate acts a thermal stabilizer.

A treatment fluid can contain additives that are commonly used in oil field applications, as known to those skilled in the art. These include, but are not necessarily limited to, salt substitutes (such as trimethyl or tetramethyl ammonium chloride), pH control additives, surfactants, defoamers, breaker aids, oxygen scavengers, alcohols, scale inhibitors, corrosion inhibitors, hydrate inhibitors, bridging agents for fluid-loss control, oxidizers, chelating agents, water-control agents (such as relative permeability modifiers), consolidating agents, proppant flowback control agents, conductivity enhancing agents, clay stabilizers, sulfide scavengers, fibers, nanoparticles, bactericides, and combinations thereof.

Of course, additives should be selected for not interfering with the purpose of the fluid.

Methods of Treating a Well with the Fluid

According to various embodiments of the disclosure, methods of treating a treatment zone in a well are disclosed, the methods comprising: (A) forming a treatment fluid according to the disclosure; and (B) introducing the treatment fluid into a well.

A fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In various embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

In various embodiments, the step of introducing is at a rate and pressure below the fracture pressure of the treatment zone.

In various embodiments, the volume of the treatment fluid introduced into the well is the volume of a pill.

In various embodiments, the treatment fluid has a viscosity greater than 10 cP and wherein the viscosity of the treatment fluid breaks within 72 hours at a design temperature in the treatment zone.

After the step of introducing a fluid according to the disclosure, in various embodiments the methods include a step of forming a filter cake in a treatment zone of the well.

After the step of introducing a fluid according to the disclosure, in various embodiments the methods include a step of allowing time for breaking of any filter cake formed by the fluid. This preferably occurs with time under the conditions in the zone.

In various embodiments, the filter cake breaks without the application of an external fluid.

In various embodiments, the filter cake breaks within 72 hours at a design temperature in the treatment zone.

In various embodiments, the design temperature of a treatment zone is up to about 300° F. (149° C.).

In various embodiments, the step of flowing back is within 5 days of the step of introducing. In other various embodiments, the step of flowing back is within 3 days of the step of introducing.

Preferably, after any such use of a fluid according to the disclosure, a step of producing hydrocarbon from the well or a particular zone is the desirable objective.

EXAMPLES

To facilitate a better understanding of the present disclosure, the following examples of certain aspects of some embodiments are given. In no way should the following examples be read to limit, or define, the entire scope of the disclosure.

Breaker system was evaluated in the following crosslinked HEC composition as shown in Table 1.

TABLE 1

| Crosslinked HEC Fluid without Breaker or Catalyst | |
|---|---|
| Components | Concentration (1,000 mL sample) |
| Brine: NaCl + $CaCl_2$ (Ratio: Water 85 ml:NaCl 8 gram and $CaCl_2$ 5.9 gram) | Brine density 11.1 lb/gal (1,330 kg/m$^3$) |
| Viscosity increasing agent: HEC Acid till pH <1, followed by hydration | 120 lb/Mgal (14.4 kg/m$^3$) |
| Crosslinker: Magnesium Oxide | 20 lb/Mgal (2.4 kg/m$^3$) |
| Gel stabilizer: sodium thiosulfate (does not affect breaker performance) | 20 lb/Mgal (2.4 kg/m$^3$) |

Magnesium peroxide was used as a breaker.

A catalyst such as vanadium (for example, vanadyl acetylacetonate ($VO(C_5H_7O_2)_2$)), preferably in solid powder form, can be used to accelerate the breaking and to reduce the concentration of the breaker required to achieve the desired breaking time and completeness.

Viscosity measurements were made on a FANN™ Model 35 viscometer using an F1 spring and R1B1 bob at 511 sec$^{-1}$, at room temperature and atmospheric pressure.

Initial fluid viscosity of the crosslinked HEC fluid is greater than 200 cP. The viscosity for several fluids with magnesium peroxide breaker concentrations or catalyst concentrations were followed after 24 hours, 48 hours, and 72 hours at 250° F. (121° C.), as reported in Table 2.

TABLE 2

| Breaker Tests with Crosslinked HEC Fluid at 250° F. (121° C.) | | | | | |
|---|---|---|---|---|---|
| | Breaker Conc. Magnesium peroxide | Catalyst Conc. Vanadyl acetyl- | Viscosity in cP | | |
| Test | (solid powder) | acetonate | 24 hours | 48 hours | 72 hours |
| 1 | 20.0 lb/gal (2400 kg/m$^3$) | None | Not measured | Not measured | <2 |
| 2 | 10.0 lb/gal (1200 kg/m$^3$) | None | 112 | 60 | 2 |
| 3 | 10.0 lb/gal (1200 kg/m$^3$) | 0.10 g/l | 98 | 36 | 1 |
| 4 | 10.0 lb/gal (1200 kg/m$^3$) | 0.25 g/l | 70 | 28 | 2 |
| 5 | 10.0 lb/gal (1200 kg/m$^3$) | 0.50 g/l | 64 | 20 | 1 |

In Tests 1 and 2 (without catalyst) suspended solid particles (residue) were noticeable in the fluid even after completely breaking the polymer and reducing the viscosity to less than 2 cP. Whereas in other tests the amount of residue in the fluid is very less and negligible. The absence of residue at the end of the test duration in tests 3 to 5 confirms that the system with catalyst is helping for a clean and complete break of the polymer.

In addition, include a greater concentration of the catalyst such that at some of it is solid, not dissolved, therefore, won't wash of filter cake as it is formed. These example tests were "static" (in a glass jar) fluid in continuous contact with filter cake, but in actual use, the liquid phase would wash away and not be available in sufficient concentration to break polymer in the filter cake.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A treatment fluid for use in a well, the treatment fluid comprising:
   (a) water;
   (b) hydroxyalkylcellulose, wherein the hydroxyalkylcellulose is hydrated in the water-based continuous phase;
   (c) a crosslinker for the hydroxyalkylcellulose;
   (d) magnesium peroxide in particulate form in a concentration from about 10 lb/gal to about 20 lb/gal of the treatment fluid; and
   (e) a transition metal containing complex having at least one organic ligand, wherein the transition metal containing complex has a concentration within the treatment fluid in the range of about 0.10 g/l to about 0.50 g/l, wherein the transition metal containing complex is sparingly soluble in water such that between 1 gram and 10 grams of the transition metal containing complex can be hydrated or dissolved in one liter of water when tested at 77° F. and 1 atmosphere pressure for 2 hours.

2. The treatment fluid according to claim 1, wherein the treatment fluid additionally comprises: a water-soluble salt dissolved in the water, wherein the water-soluble salt is selected from the group consisting of alkali metal salts, alkaline earth metal salts, and ammonium salts;
   wherein the group consisting of alkali metal salts, alkaline earth metal salts, and ammonium salts is further selected from the group consisting of halides and formates.

3. The treatment fluid according to claim 1, wherein the treatment fluid additionally comprises: a water-soluble salt dissolved in the water, wherein the water-soluble salt is selected from the group consisting of alkali metal salts, alkaline earth metal salts, and ammonium salts;
   wherein the water having the water-soluble salt dissolved therein has a density in the range of about 1 g/cc to about 1.8 g/cc.

4. The treatment fluid according to claim 1, wherein the hydroxyalkylcellulose comprises hydroxyethylcellulose.

5. The treatment fluid according to claim 1, wherein the crosslinker is an alkaline earth metal oxide.

6. The treatment fluid according to claim 1, wherein the magnesium peroxide in particulate form has a mesh size in the range of about 300 US mesh to about 100 US mesh.

7. The treatment fluid according to claim 1, wherein the magnesium peroxide in particulate form is not encapsulated.

8. The treatment fluid according to claim 1, wherein a transition metal of the transition metal containing complex is selected from the group consisting of vanadium, manganese, iron, titanium, and cobalt.

9. The treatment fluid according to claim 1, wherein the transition metal containing complex does not have an inorganic ligand.

10. The treatment fluid according to claim 1, wherein the transition metal containing complex does not have a ligand selected from the group of halides.

11. The treatment fluid according to claim 1, wherein the transition metal containing complex is selected from the group consisting of: vanadyl acetylacetonate (VO($C_5H_7O_2$)$_2$), titanium bis(acetylacetonate)dichloride, manganese (III) acetylacetonate, iron acetylacetonates, cobalt acetylacetonates.

12. The treatment fluid according to claim 1, wherein the transition metal containing complex is: vanadyl acetylacetonate (VO($C_5H_7O_2$)$_2$).

13. The treatment fluid according to claim 1, additionally comprising an alkali metal thiosulfate.

14. The treatment fluid according to claim 1, wherein the hydroxyalkylcellulose has a concentration in the range of about 100 lb/Mgal to about 150 lb/Mgal of the treatment fluid.

15. The treatment fluid according to claim 14, wherein the hydroxyalkylcellulose has a concentration of about 120 lb/Mgal of the treatment fluid.

16. The treatment fluid according to claim 15, wherein the crosslinker has a concentration of about 20 lb/Mgal of the treatment fluid.

17. The treatment fluid according to claim 1, wherein the magnesium peroxide has a concentration of about 10.0 lb/gal of the treatment fluid.

18. The treatment fluid according to claim 1, wherein the transition metal containing complex is in solid powder form.

19. A treatment fluid for use in a well, the treatment fluid comprising:
 (a) water;
 (b) hydroxyalkylcellulose, wherein the hydroxyalkylcellulose is hydrated in the water-based continuous phase;
 (c) a crosslinker for the hydroxyalkylcellulose;
 (d) magnesium peroxide in particulate form present in a concentration of at least 10 lb/gal of the treatment fluid; and
 (e) a transition metal containing complex having at least one organic ligand, wherein the transition metal containing complex has a concentration within the treatment fluid in the range of about 0.10 g/l to about 0.50 g/l, wherein the transition metal containing complex is sparingly soluble in water such that between 1 gram and 10 grams of the transition metal containing complex can be hydrated or dissolved in one liter of water when tested at 77° F. and 1 atmosphere pressure for 2 hours.

20. The treatment fluid according to claim 1, wherein a pH of a phase of the treatment fluid comprising water is in the range of about 0.1 to about 2.5.

* * * * *